(12) United States Patent
McGuffin et al.

(10) Patent No.: US 8,121,140 B2
(45) Date of Patent: Feb. 21, 2012

(54) COST CONTAINMENT OF MOBILE DATALINK COMMUNICATIONS

(75) Inventors: Thomas F. McGuffin, Morristown, NJ (US); Tom D. Judd, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 546 days.

(21) Appl. No.: 12/018,654

(22) Filed: Jan. 23, 2008

(65) Prior Publication Data

US 2008/0205283 A1 Aug. 28, 2008

Related U.S. Application Data

(60) Provisional application No. 60/891,983, filed on Feb. 28, 2007.

(51) Int. Cl.
*H04L 12/28* (2006.01)

(52) U.S. Cl. .................................................. 370/431

(58) Field of Classification Search .................. 370/238, 370/341, 431
See application file for complete search history.

(56) References Cited

U.S. PATENT DOCUMENTS

| | | | |
|---|---|---|---|
| 6,072,784 A * | 6/2000 | Agrawal et al. ............... 370/311 |
| 6,134,453 A * | 10/2000 | Sainton et al. ............. 455/553.1 |
| 7,107,062 B2 | 9/2006 | Cruz et al. |
| 2001/0036822 A1 | 11/2001 | Mead et al. |
| 2002/0071542 A1* | 6/2002 | Hedden .................... 379/221.02 |
| 2003/0161288 A1* | 8/2003 | Unruh ............................ 370/338 |
| 2006/0172721 A1* | 8/2006 | Dawson et al. ............... 455/405 |

* cited by examiner

*Primary Examiner* — Derrick Ferris
*Assistant Examiner* — Mang Yeung
(74) *Attorney, Agent, or Firm* — Fogg & Powers LLC

(57) ABSTRACT

A method for transmitting messages over a datalink communication system is disclosed. The method comprises assigning each message a cost index value based on prescribed factors for at least one message transmission attribute of the message and transmitting each message that satisfies a select transmission attribute over at least one mobile communications sub-network associated with a datalink communication system.

17 Claims, 6 Drawing Sheets

COST CONTAINMENT OF MOBILE DATALINK COMMUNICATIONS

This application claims the benefit of priority to U.S. Provisional Application No. 60/891,983 filed on Feb. 28, 2007, the disclosure of which is incorporated herein by reference.

BACKGROUND

The recurring cost of aircraft air to ground datalink messages is significant for most commercial aircraft operations. Messaging rates vary considerably based on service providers, the aircraft's location, the applicable air to ground datalink sub-networks within the vicinity of the aircraft, and any contracts between the airline and the service providers.

For example, commercial airlines attempt to contain these costs by monitoring and enforcing which air to ground datalink sub-network(s) the messages are allowed to transmit on. Since rates for a specific datalink sub-network vary by service provider, significant recurring costs are experienced by the airlines on a continual basis. Over time, any incremental improvement in controlling these communications expenses will represent a substantial savings for the airlines.

For the reasons stated above and for other reasons stated below which will become apparent to those skilled in the art upon reading and understanding the present specification, there is a need in the art for improvements in cost containment of mobile datalink communications.

SUMMARY

The following specification discloses at least one method of cost containment in mobile datalink communications. This summary is made by way of example and not by way of limitation. It is merely provided to aid the reader in understanding some aspects of one or more embodiments described in the following specification. Particularly, in one embodiment, a method for transmitting messages over a datalink communications system is provided. The method assigns each message a cost index value based on prescribed factors for at least one message transmission attribute of the message and transmits each message that satisfies a select transmission attribute over at least one mobile communications sub-network associated with a datalink communication system.

DRAWINGS

These and other features, aspects, and advantages are better understood with regard to the following description, appended claims, and accompanying drawings where:

Like reference characters denote like elements throughout the figures and text of the specification.

DETAILED DESCRIPTION

The following detailed description relates to at least one embodiment for cost containment of mobile datalink communications that controls and indexes costs for messaging with features in a communications management unit (CMU) over various service providers. Examples of these various service providers include, without limitation, Aeronautical Radio Incorporated (ARINC), Société Internationale de Télécommunications Aéronautiques' (SITA), and Avicom Japan Limited (AVICOM). In one embodiment, the CMU comprises at least one data structure that allows the airline (that is, the customer) to define the attributes of messages to be transmitted. For example, a cost containment module includes a cost index as a message attribute dimension. Using the cost containment module discussed here, the customer assigns each message a variable cost index value based on payment criteria that corresponds to how much the customer is willing to pay for timely delivery of a particular message over the various service providers. The CMU further comprises at least one data structure that allows the airline (that is, the customer) to define the attributes of the air to ground sub-networks available for data transmission. Using the cost containment module discussed here, the customer assigns each sub-network a variable cost index value based on payment criteria that corresponds to how much the customer is billed for data transmission by the various service providers.

Although reference is made to air to ground datalink applications involving commercial aircraft, the cost containment techniques discussed here will be useful in ground-based or shipboard, high-altitude military manned and unmanned aircraft; and any applicable naval or personal watercraft applications (among others) which involve the assignment of cost relative to the importance of delivery time for a communications message based on the geographic location of the craft.

Figure 1:
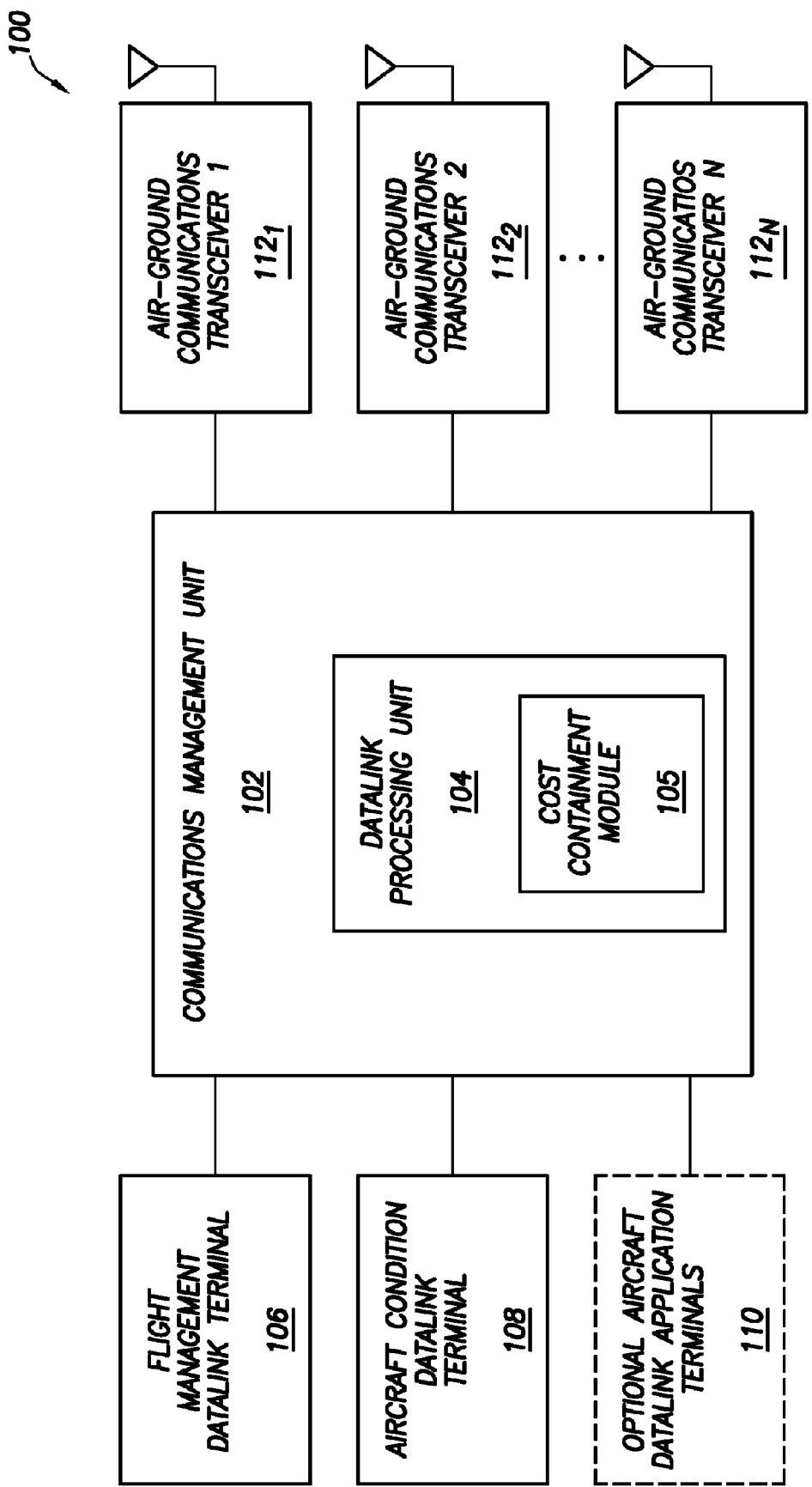
FIG. 1 is a block diagram of an embodiment of a datalink communications system.

FIG. 1 is a block diagram of an embodiment of an aircraft portion of an air to ground datalink communications system 100. In the example embodiment of FIG. 1, the datalink communications system 100 is representative of an avionics air-ground communications system 100 on an aircraft. The system 100 comprises a CMU 102, the CMU 102 further comprising a datalink processing unit 104. The datalink processing unit 104 includes a cost containment module 105. The system 100 further comprises a flight management datalink terminal 106, an aircraft condition datalink terminal 108, and optional aircraft datalink application terminals 110, each of which are communicatively coupled to the CMU 102. It is understood that the system 100 is capable of accommodating any appropriate number of datalink applications and datalink terminals (for example, the flight management datalink terminal 106, the aircraft condition datalink terminal 108, and one or more of the optional aircraft datalink application terminals 110) in a single system 100.

The system 100 further comprises air-ground communications transceivers $112_1$ to $112_N$ coupled to the CMU 102. It is understood that the system 100 is capable of accommodating any appropriate number of air-ground communications transceivers 112 (for example, one or more air-ground communications transceivers 112) in a single system 100. The air-ground communications transceivers 112 are operable for communication with a plurality of air to ground datalink communication mediums including, without limitation, at least one of a very high frequency (VHF), high frequency (HF), Satellite Communications (SATCOM), and similar mobile air to ground or ground-based communication network and sub-network mediums. In one embodiment, the mobile air to ground or ground-based communication network mediums comprise at least one of a Gatelink network, a Wi-Fi network, a Worldwide Interoperability for Microwave Access (WiMAX) network, one or more cellular communications networks, and the like.

In the example embodiment of FIG. 1, each message for transmission over the air-ground communications transceivers $112_1$ to $112_N$ is assigned a cost index value, and each of the air to ground sub-networks are assigned a service cost index based on predetermined service provider contracts. When the customer is willing to pay more for expeditious message delivery, then that message is assigned a high cost index value. When the customer is willing to wait and pay less for a message, a low cost index value is assigned. In one implementation, the prescribed cost criteria for message transmission comprise a message priority level that is predetermined, user-selectable, or a combination thereof. For example, the prescribed criteria for cost containment of air to ground datalink communications as discussed herein are pre-programmed for operation on the datalink processing unit 104, as further discussed below with respect to FIGS. 2A to 3B.

In operation, datalink avionics within the datalink processing unit 104 and the CMU 102 comprise a data structure that defines the cost index for each air to ground datalink sub-network (for example, the cost containment module 105). For example, different cost index values are assigned for the same air to ground datalink sub-network at different geographic locations. In the example embodiment of FIG. 1, a message is allowed to be transmitted on any datalink sub-network with an equal or lower cost index. If the only available datalink sub-networks have a higher cost index, then the message is stored until a datalink sub-network with an equal or lower cost index becomes available. In one implementation, the message is stored for later transmission in an originating terminal (for example, one of the flight management datalink terminal 106, the aircraft condition monitoring datalink terminal 108, or the optional aircraft datalink application terminals 110). In this same (or alternate) implementation(s), feedback to crewmembers responsible for the aircraft indicates the message is being stored. Additionally, the crewmembers have the option to override the logic and send the message immediately. In one implementation, the customer controls this override option with pre-installed configuration options in the avionics logic of the CMU 102. For example, the CMU 102 provides a SEND prompt for a message that indicates whether there is an acceptable air to ground datalink sub-network available at the current time.

Figure 2A:
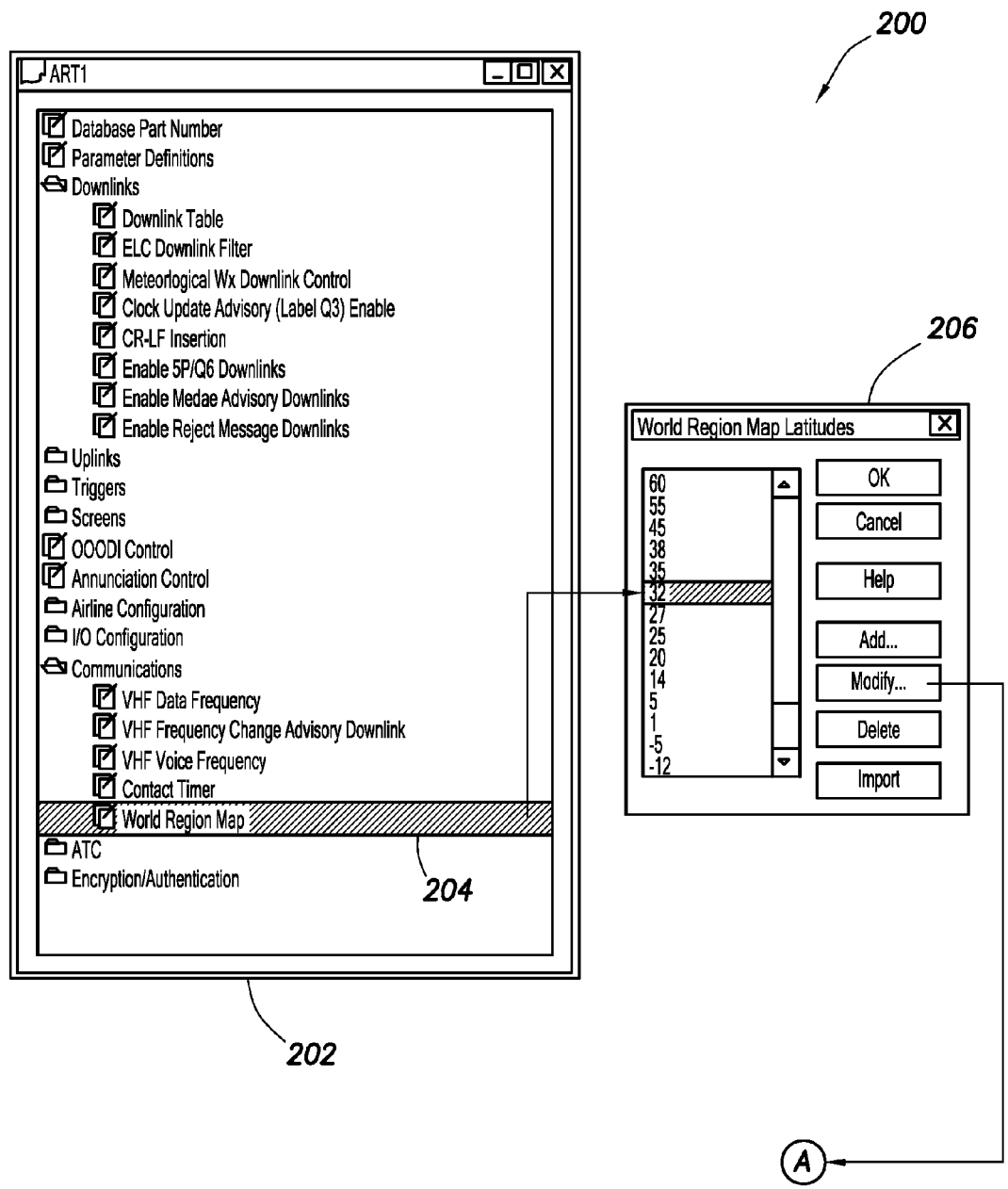
FIGS. 2A and 2B are block diagrams illustrating an embodiment of a programming interface module for cost containment of mobile datalink communications.
Figure 2B:
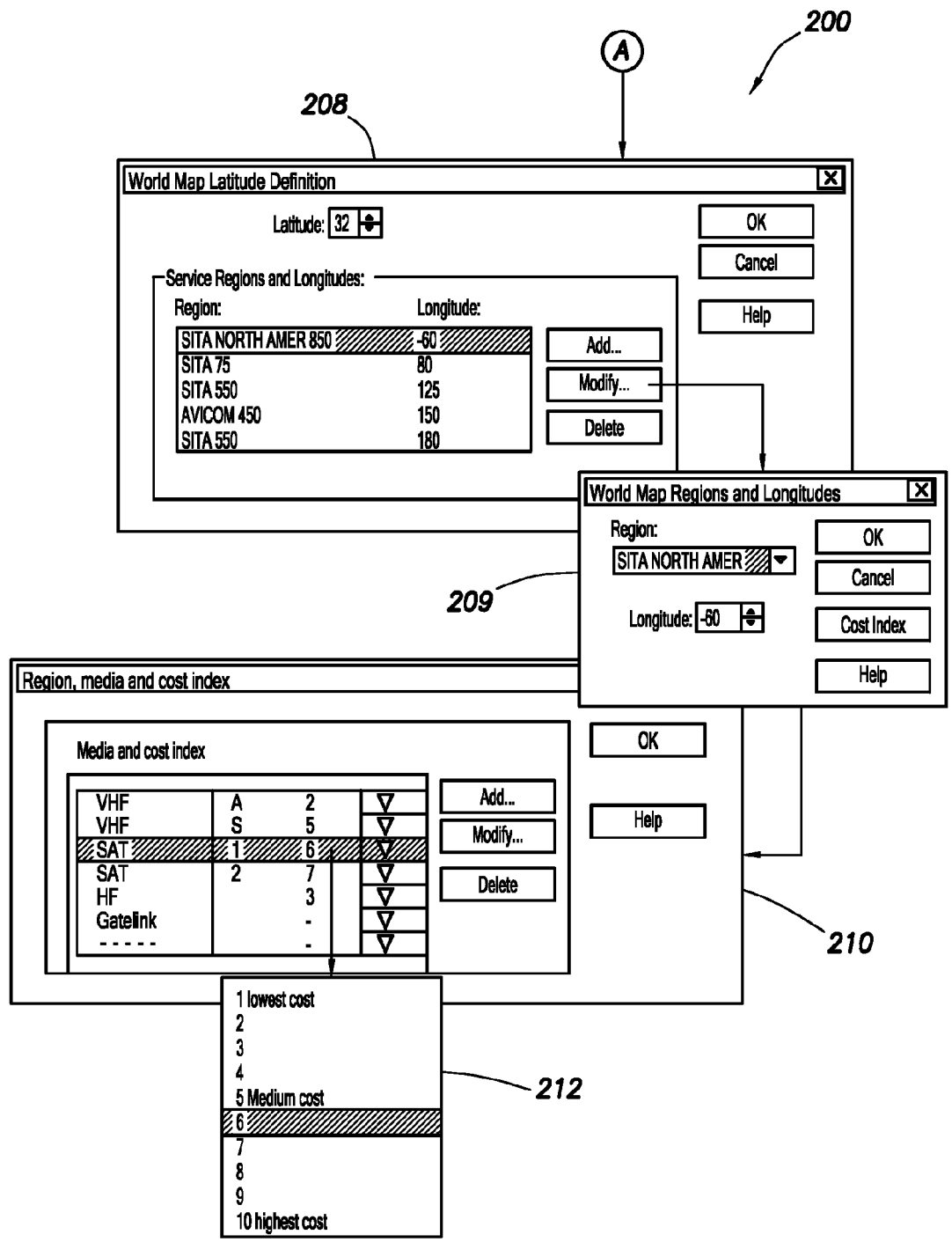

FIGS. 2A and 2B illustrate screen shots of at least one embodiment of a programming interface module for cost containment of air to ground datalink communications. For example, the screen shots shown in FIGS. 2A and 2B represent one of an embedded or an external configuration software module for configuring cost attributes to be processed by a cost containment software module in a datalink communications system similar to the system shown in FIG. 1. In one embodiment, the programming interface module shown in FIGS. 2A and 2B is used for configuration of the system 100 of FIG. 1 (for example, the module 200 comprises programming interface screens for a cost containment module similar to the cost containment module 105). For example, in one implementation, the configuration is performed using one of the datalink terminals described above with respect to the system 100. In at least one alternate implementation, a ground-based software application is operable to generate a configuration file for the cost containment software module for the system 100.

For example, the module 200 of FIG. 2A allows the entry of values that specify the service to be provided over an air to ground datalink communications sub-network. Specifically, the module 200 includes a pull down menu 202 and a communications sub-menu structure 204 labeled "World Region Map." In one implementation, the world region data structure 204 allows a customer to define geographic regions, assign the VHF frequencies for that region, and assign any applicable air to ground datalink sub-network and service provider preferences for that region. As further discussed below, the module 200 is operable to assign each specified air to ground datalink sub-network within the world map data structure 204 a cost index value. The module 200 allows the customer to define the geographic regions appropriate for any predetermined service contracts and mobile communications sub-network service providers.

The pull down menu 202 includes a list of the types of services that are included in a communications management unit (for example, the CMU 102 of FIG. 1). Further, selection of the sub-menu 204 provides a dialog box 206 including various datalink communications service providers based on geographical region. In one example, selecting the "Modify" operation in the dialog box 206 provides a user with a dialog box 208. In one implementation, the dialog box 208 comprises a "Cost Index" selection operable to configure a message transmission priority index value for the geographic region selected. For example, to establish cost containment criteria for a selected datalink communications service provider, a dialog box 209 is selectably configured to provide access to a cost index dialog box 210. The cost index dialog box 210 includes field values 212 that comprise an attribute threshold value to define an acceptable range for at least one of the criteria for message transmission. In one example, field 212 receives a threshold value for an acceptable payment amount for each of the available service providers selected by the user. In the example embodiment of FIG. 2B, the attribute threshold value is pre-configured for each of the service providers specified in the module 200.

Figure 3A:
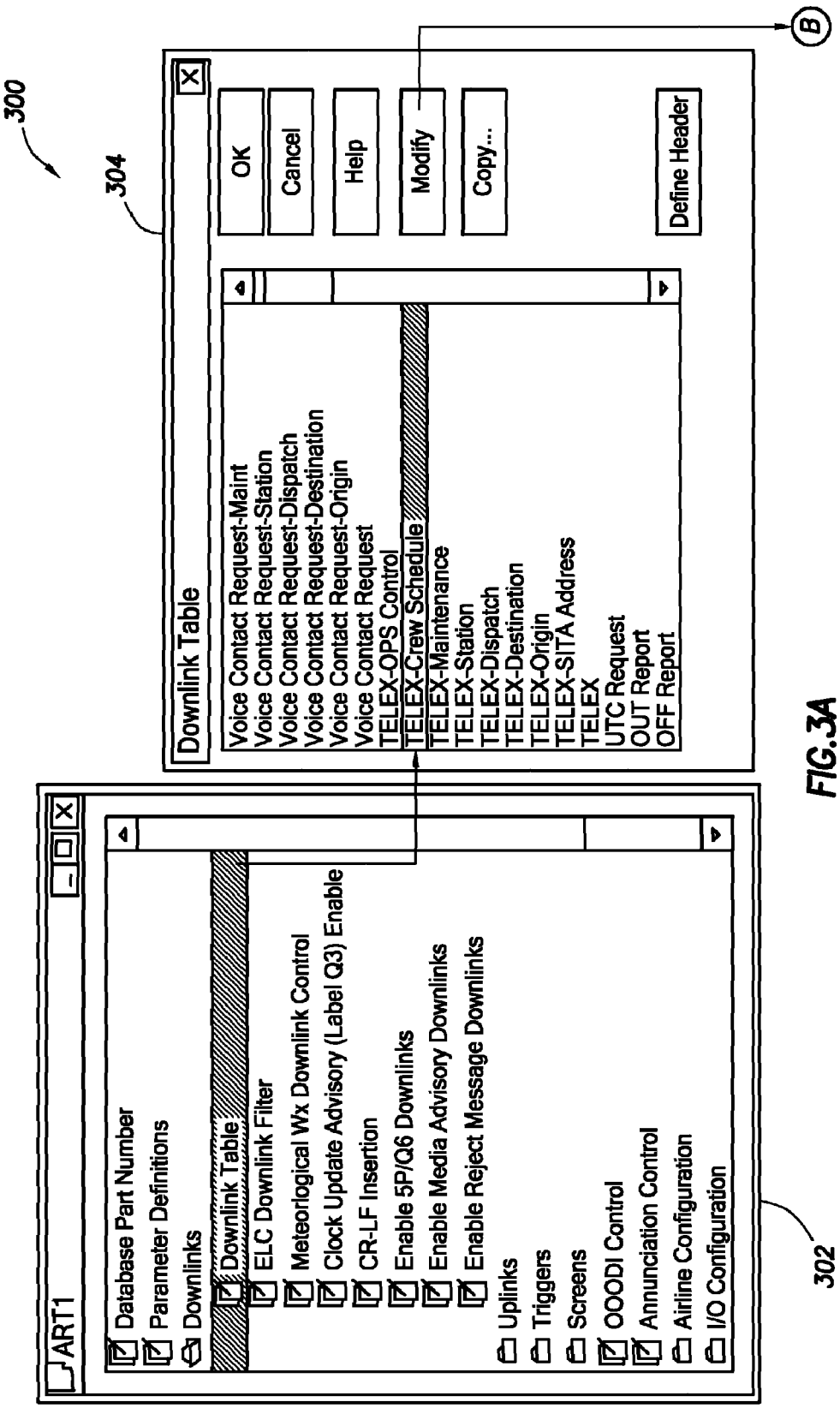
FIGS. 3A and 3B are block diagrams illustrating an embodiment of a programming interface module for cost containment of mobile datalink communications.
Figure 3B:
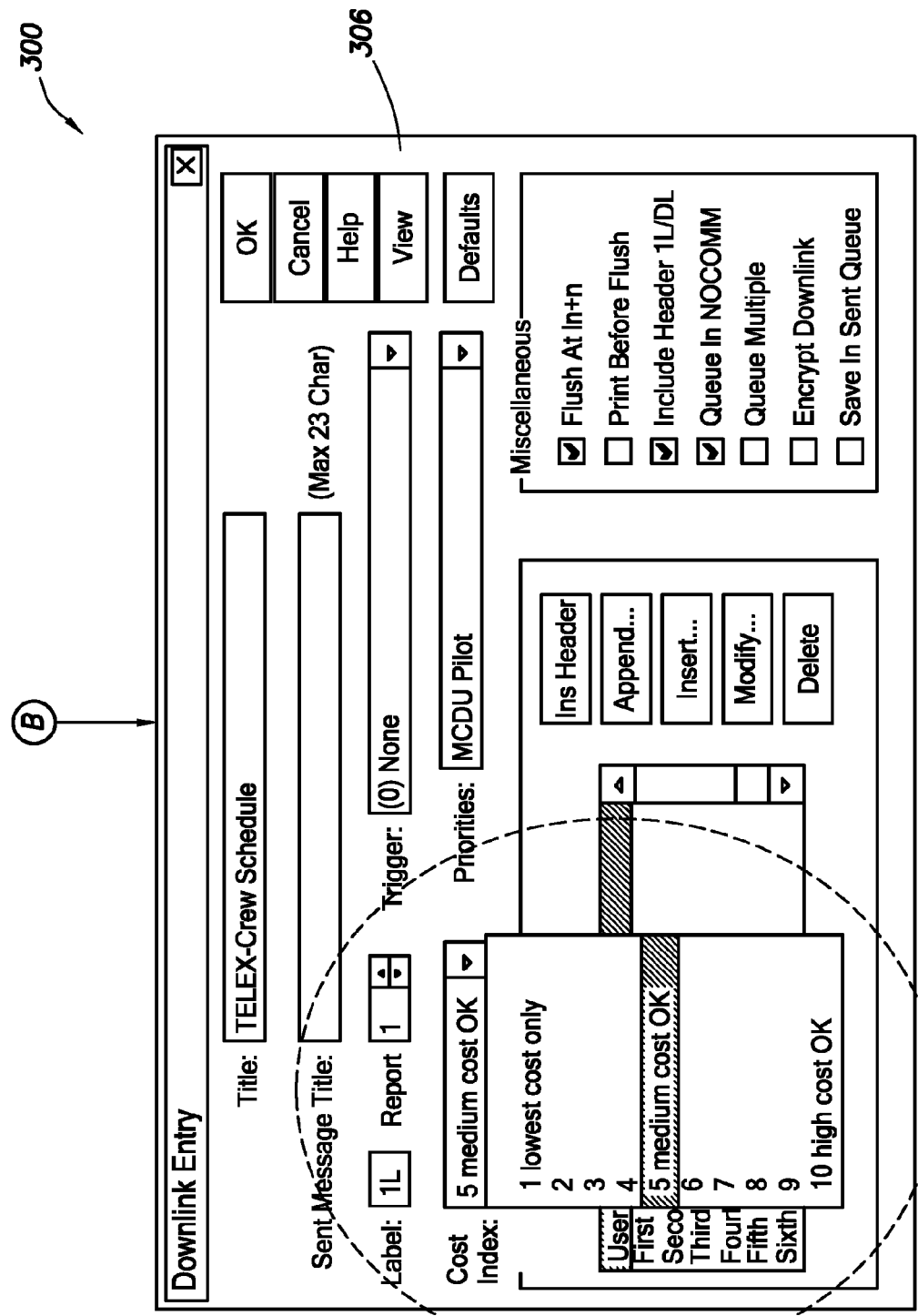

FIGS. 3A and 3B illustrate screen shots of at least one alternate embodiment of a programming interface module for cost containment of air to ground datalink communications. For example, the screen shots shown in FIGS. 3A and 3B represent one embodiment of an embedded or an external configuration software module for configuring cost attributes to be processed by a cost containment software module in a datalink communications system similar to the system shown in FIG. 1. In one embodiment, the programming interface module shown in FIGS. 3A and 3B is used for at least a portion of the configuration of the system 100 of FIG. 1 (for example, the module 300 comprises programming interface screens for a cost containment module similar to the cost containment module 105). Moreover, the module 300 provides at least a portion of the datalink avionics user interface software displayed on at least one of the datalink terminals described above with respect to the system 100.

In one embodiment, the module 300 allows specification of values to define cost index values for specific air to ground datalink communications message types. In other embodiments, other appropriate index values for each of the air to ground datalink communications message types can be specified using the module 300. Specifically, the module 300 includes a pull down menu 302 and a datalink communications messaging sub-menu item labeled "Downlink Table." Similar to FIGS. 2A and 2B, the pull down menu 302 includes a list of the types of services that are included in a communications management unit. Further, the "Downlink Table" selection in the pull down menu 302 provides a downlink table dialog box 304 including various messaging definition types. In one example, selecting the "TELEX—Crew Schedule" operation in the dialog box 304 provides the user with a dialog box 306. In one implementation, the dialog box 306 includes at least a cost index field 308 for each message type.

The cost index field 308 is a pick list that defines the cost index attribute for each type of message, as discussed in further detail below.

In one implementation as shown in FIG. 3B, a cost index value scale is 1 to 10 with 1 being the lowest cost and 10 the highest cost. It is understood that other, additional scale ranges are possible, and the embodiments discussed here are not limited by cost index value scale boundaries of 1 to 10 (for example, in one embodiment, the value 10 represents the most desired sub-network, and the value 1 the least desired sub-network). If the customer is willing to pay more for substantially faster message delivery, each of the modules 200 and 300 are configured to assign a cost index value close to 10. For example, if the customer is willing to wait in order to pay less for message delivery, the module 200 of FIGS. 2A and 2B assigns a low cost index value (for example, from 1 to 3). In a similar implementation, the customer uses the module 300 to assign a cost index value close to 10 for an expensive air to ground datalink sub-network, and assigns a cost index value close to 1 for an inexpensive air to ground datalink sub-network. Moreover, the module 200 is operable to assign each air to ground datalink sub-network an individual cost index value (for example, the module 200 will not allow two different sub-networks to have the same cost index value of 3).

In operation, for each message sent by the avionics software in the CMU 102, the module 200 compares the message cost index value with the cost index value of the available air to ground datalink sub-networks. In one embodiment, the CMU 102 is configured by the module 200 to transmit each of the messages at an appropriate time. When a message is generated, message attributes including the assigned cost index value and priority are associated with each message. When multiple messages are queued for transmission, the transmission order is determined by the priority. In one implementation, the datalink processing unit 104 is configured to search a queue of arranged messages, starting with the highest priority messages, when at least one of the mobile communications sub-networks considered to operate substantially within the assigned cost index value becomes available. For example, if there is a plurality of available air to ground datalink sub-networks with a cost index value equal to or less than the message cost index, then the message is sent via the least expensive air to ground datalink sub-network. In one implementation, the least expensive air to ground datalink sub-network can comprise one or more similar sub-networks, and the cost index value is based on which service provider provides the least expensive service. Otherwise, the message is stored until a suitable (that is, less expensive) air to ground datalink sub-network becomes available.

Alternatively, for messages initiated by a pilot, the module 300 is configured for providing datalink communications over any air to ground datalink sub-network available at the moment to transmit the message, regardless of cost. This availability information would be updated as the availability status of air to ground datalink sub-networks changes. For example, referring back to FIG. 1, if the pilot creates a message when there is no suitable datalink sub-network, the datalink processing unit 104 stores the message and automatically sends it when a suitable air to ground sub-network becomes available. In one implementation, the module 300 allows the pilot to override the normal cost containment logic in the cost containment module 105 and cause a specific message to be sent immediately. The override only applies to the one message and the normal cost containment logic will apply in the next instance of this message. In alternate implementations, the customer is able to rigidly enforce the message routing policy. Moreover, similar logic is suitable for a plurality of attribute dimensions similar to cost containment (for example, at least one of security, reliability, priority, transit time, maintenance intervals, and flight operations). In one implementation, weighted, multidimensional voting logic within each of the programming interface modules 200 and 300 determines which air to ground communications sub-network and mobile communications service provider substantially matches the desired transmission attributes for cost-contained message delivery.

Figure 4:
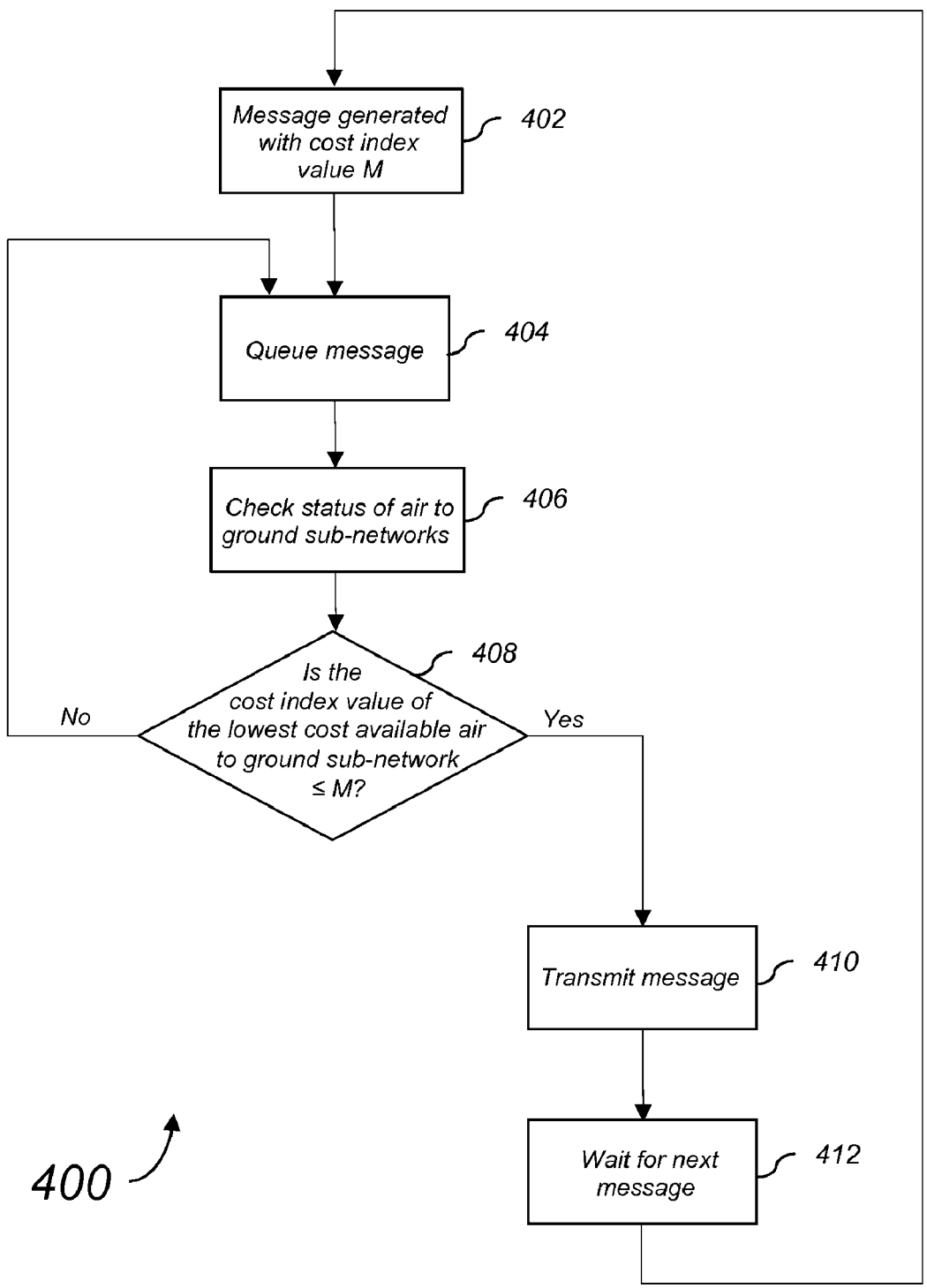
FIG. 4 is a flow diagram illustrating an embodiment of a method for transmitting messages over a datalink communications system.

FIG. 4 is a flow diagram illustrating a method 400 for transmitting messages over a datalink communications system. The method 400 addresses cost containment when selecting an air to ground sub-network based on the cost attributes of the message and available air to ground sub-networks for transmitting a message in the datalink communications system discussed above with respect to FIG. 1. For example, the method 400 assigns a cost index value to messages based on at least one select message transmission attribute (for example, message transmission rates over various service providers, where each service provider is assigned the cost index value M) at block 402. In one implementation, the cost index value is defined based on a message transmission schedule including at least one of a geographic region, available transmission mediums, and message transmission cost within the geographic region. As further shown in FIG. 4, the method 400 manages the message transmissions over air to ground communications sub-networks associated with the datalink communications system (for example, the method 400 stores each of the messages in a queue for later transmission once the cost index value is below a threshold level of the assigned cost index value) at block 404. When at least one of the associated air to ground communications sub-networks operating within the select transmission attribute is available (block 406), and the cost index value of the lowest cost air to ground sub-network is less than or equal to the assigned cost index value M (block 408), the method 400 transmits that message over the sub-network meeting the selection criteria (block 410). If the select message transmission attribute is not substantially satisfied (for example, acceptable datalink networks are not available), the method 400 queues the messages for later transmission (block 404). In one implementation, for example, the datalink processing unit 104 of the system 100 is configured to arrange each of the messages for transmission based on the select message transmission attribute. As shown in FIG. 4, the method 400 repeats as additional messages are prepared for transmission over at least one of the acceptable datalink sub-networks (block 412).

The methods and techniques described herein may be implemented in a combination of digital electronic circuitry and software (or firmware) residing in a programmable processor. An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM). In addition, storage media suitable for tangibly embodying computer program instructions and data include all forms of non-volatile memory, and include by way of example, semiconductor memory devices; magnetic disks such as internal hard disks and removable disks; magneto-optical discs; optical discs, and other computer-readable media. Any of the foregoing may be supplemented by, or incorporated in, specially-designed application-specific integrated circuits (ASICs).

When information is transferred or provided over an air to ground datalink sub-network or another communications connection (either hardwired, wireless, or a combination of hardwired or wireless) to a computer, the computer properly views the connection as a computer-readable medium. Thus, any such connection is properly termed a computer-readable medium. Combinations of the above are also included within the scope of computer-readable media.

This description has been presented for purposes of illustration, and is not intended to be exhaustive or limited to the embodiments disclosed. Variations and modifications may occur, which fall within the scope of the following claims.

What is claimed is:

1. A method for transmitting messages over a datalink communication system, the method comprising:
   assigning each message a cost index value based on prescribed factors for at least one message transmission attribute of the message, wherein the prescribed factors include at least a message priority level, and wherein assigning each of the messages the cost index value further comprises defining the cost index value based on a message transmission schedule including at least one of a geographic region, available transmission mediums and message transmission cost within the geographic region;
   assigning each of a plurality of mobile communication sub-networks a service cost index;
   selecting a first mobile communications sub-network from the plurality of mobile communications sub-networks currently available based on a comparison between the cost index value assigned to the message and the service cost index values assigned to each of the plurality of mobile communication sub-networks, wherein each mobile communications sub-network is associated with one of a plurality of service providers; and
   transmitting each message that satisfies the message transmission attribute over the first mobile communications sub-network associated with a datalink communication system; and
   queuing the messages for later transmission once the cost index value is below an attribute threshold level.

2. The method of claim 1 and further comprising managing a plurality of message transmissions based on the message priority level.

3. The method of claim 1, wherein transmitting each of the messages that satisfy the select transmission attribute comprises:
   arranging each of the associated messages based on the select transmission attribute; and
   when the select transmission attribute is not substantially satisfied, storing the arranged messages until the at least one mobile communications sub-network considered to operate within the select transmission attribute becomes available.

4. The method of claim 1 and further comprising providing an optional override mechanism to send the message independent of the prescribed factors.

5. A datalink communication system, comprising:
   at least one communications management unit having a datalink processing unit, the datalink processing unit operable to manage message transmissions by assigning each of the messages a cost index value, wherein assigning each of the messages the cost index value further comprises defining the cost index value based on a message transmission schedule including at least one of geographic region, and access to one or more mobile communications sub-networks each with an assigned service cost index associated with a datalink communication system, and message transmission cost within the geographic region;
   at least one air-ground communications transceiver in operative communications with the communications management unit, wherein the at least one air-ground communications transceiver operable to transmit at least one of the messages at an appropriate time to at least one of the mobile communications sub-networks based on the assigned service cost index and the cost index value; and
   a plurality of datalink terminals in operative communication with the at least one communications management unit, each datalink terminal operable to store at least one of the messages when the cost index value of the message is below an attribute threshold level for later transmission until at least one of the mobile communications sub-networks considered to operate substantially within prescribed criteria becomes available to the at least one air-ground communications.

6. The system of claim 5, wherein each of the plurality of datalink terminals comprises an optional override mechanism to send a message independent of the prescribed criteria.

7. The system of claim 5, wherein the at least one communications management unit further includes a cost containment module.

8. The system of claim 7, wherein the cost containment module is operable to transmit each of the messages over at least one of the mobile communications sub-networks using a service provider that satisfies the prescribed criteria.

9. The system of claim 7, wherein the cost containment module comprises a portion of the datalink processing unit.

10. The system of claim 5, wherein the at least one communications management unit is configured for use with an aircraft.

11. The system of claim 5, wherein the at least one communications management unit is configured to assign one or more service providers a different cost index value for the same mobile communications sub-network based on a particular geographic location.

12. The system of claim 5, wherein the at least one air-ground communications transceiver comprises at least one of a very high frequency (VHF), high frequency (HF), satellite communication (SATCOM), cellular, or wireless network transceiver.

13. The system of claim 5, wherein the at least one air-ground communications transceiver is operable with one or more mobile datalink communications sub-networks.

14. A method of providing cost containment of mobile datalink communications using a communications management unit, the method comprising:
   assigning each of a plurality of mobile communication sub-networks a service cost index;
   identifying a service provider sub-network among a plurality of mobile communication sub-networks from a plurality of service providers for transmitting messages from the communications management unit based on a current location;

selectively assigning a cost index value for each message to be transmitted;

wherein assigning each of the messages the cost index value further comprises defining the cost index value based on a message transmission schedule including at least one of a geographic region, available transmission mediums and message transmission cost within the geographic region;

transmitting each of the messages at an appropriate time based on the availability and the service cost index of the identified service provider mobile communication sub-network and the selected cost index value; and queuing the messages for later transmission once the cost index value is below an attribute threshold level.

15. The method of claim 14, wherein identifying the service provider sub-network comprises determining a current geographic region and the available service provider sub-networks within the current geographic region.

16. The method of claim 14, wherein selectively assigning the cost index value further comprises defining a message priority level based on a pre-configured message transmission schedule including at least one of a geographic region, a message transmission time, a secure transmission medium, and a message transmission cost within the geographic region.

17. The method of claim 14, wherein transmitting the at least one message at the appropriate time comprises:

arranging each of the messages for transmission based on the assigned cost index value; and storing the arranged messages until at least one of the mobile communications sub-networks considered to operate within the assigned cost index value becomes available.

* * * * *